US012569706B2

(12) United States Patent
Cho

(10) Patent No.: US 12,569,706 B2
(45) Date of Patent: Mar. 10, 2026

(54) VEHICLE COMPRISING BATTERY DEVICE AND FIRE EXTINGUISHING AGENT TANK

(71) Applicant: SK On Co., Ltd., Seoul (KR)

(72) Inventor: Sei Hoon Cho, Daejeon (KR)

(73) Assignee: SK On Co., Ltd., Seoul (KR)

( * ) Notice: Subject to any disclaimer, the term of this patent is extended or adjusted under 35 U.S.C. 154(b) by 166 days.

(21) Appl. No.: 18/599,516

(22) Filed: Mar. 8, 2024

(65) Prior Publication Data

US 2024/0342524 A1 Oct. 17, 2024

(30) Foreign Application Priority Data

Apr. 11, 2023 (KR) ........................ 10-2023-0047720

(51) Int. Cl.

| | |
|---|---|
| ***A62C 3/07*** | (2006.01) |
| ***A62C 3/06*** | (2006.01) |
| ***A62C 3/16*** | (2006.01) |
| ***A62C 35/02*** | (2006.01) |
| ***A62C 35/13*** | (2006.01) |
| ***A62C 35/68*** | (2006.01) |
| ***A62C 37/10*** | (2006.01) |
| ***A62C 37/40*** | (2006.01) |
| ***A62C 37/44*** | (2006.01) |

(52) U.S. Cl.

CPC .................. *A62C 3/07* (2013.01); *A62C 3/06* (2013.01); *A62C 3/16* (2013.01); *A62C 35/02* (2013.01); *A62C 35/13* (2013.01); *A62C 35/68* (2013.01); *A62C 37/10* (2013.01); *A62C 37/40* (2013.01); *A62C 37/44* (2013.01)

(58) Field of Classification Search

CPC .... A62C 3/06; A62C 3/07; A62C 3/16; A62C 35/02; A62C 35/11; A62C 35/13; A62C 35/15; A62C 35/68; A62C 37/04; A62C 37/10; A62C 37/40; A62C 37/44

See application file for complete search history.

(56) References Cited

U.S. PATENT DOCUMENTS

| | | | | |
|---|---|---|---|---|
| 9,390,566 B2 * | 7/2016 | Taylor | ...................... | G07C 5/00 |
| 2022/0355138 A1 * | 11/2022 | Baeder | .................. | A62C 35/68 |

FOREIGN PATENT DOCUMENTS

| | | | | |
|---|---|---|---|---|
| CN | 115548503 A | 12/2022 | | |
| DE | 102019219207 A1 * | 6/2021 | ............... | A62C 3/16 |
| KR | 10-2020-0017822 A | 2/2020 | | |
| KR | 10-2023-0001546 A | 1/2023 | | |

* cited by examiner

*Primary Examiner* — Kyle Robert Thomas

(74) *Attorney, Agent, or Firm* — Jones Day

(57) ABSTRACT

A vehicle is disclosed. The vehicle includes a battery device, a fire extinguishing agent tank accommodating a fire extinguishing agent, a first flow path connected to the battery device and the fire extinguishing agent tank, a valve configured to regulate opening of the first flow path, a second flow path connected to the fire extinguishing agent tank, and an external inlet connected to the second flow path and configured to receive the fire extinguishing agent from an external device.

12 Claims, 4 Drawing Sheets

VEHICLE COMPRISING BATTERY DEVICE AND FIRE EXTINGUISHING AGENT TANK

CROSS-REFERENCE TO RELATED APPLICATIONS

This patent document claims the priority and benefits of Korean Patent Application No. 10-2023-0047720 filed on Apr. 11, 2023, the disclosure of which is incorporated herein by reference in its entirety.

TECHNICAL FIELD

The technology and implementations disclosed in this patent document generally relate to a vehicle including a battery device and a fire extinguishing agent tank.

BACKGROUND

Unlike primary batteries, secondary batteries may be charged and discharged, so secondary batteries may be applied to various fields, such as digital cameras, mobile phones, laptops, hybrid vehicles, electric vehicles, and energy storage systems (ESSs). Secondary batteries may include a lithium ion battery, a nickel-cadmium battery, a nickel-metal hydride battery, or a nickel-hydrogen battery.

Secondary batteries are manufactured as flexible pouch-type battery cells or rigid prismatic or cylindrical can-type battery cells. A plurality of battery cells may be formed as a stacked cell assembly. The cell assembly may be disposed inside a module housing to form a battery module, and a plurality of battery modules may be disposed inside a pack housing to form a battery pack.

SUMMARY

An electric vehicle or hybrid vehicle driven by an electric driving source may include a battery device. If a fire occurs in one battery cell of a battery device including a plurality of battery cells, the fire may spread to other, adjacent battery cells, or other parts of the vehicle.

A fire that breaks out in a battery device disposed in a vehicle may be difficult to extinguish. For example, it may take time for a fire extinguishing device to move to a location of the vehicle. In addition, if a fire occurs in a battery device disposed in a vehicle, it may be difficult to directly deliver a fire extinguishing agent from the outside of the vehicle to the battery device.

According to an aspect of the present disclosure, a vehicle capable of delaying an initial fire may be provided.

According to an aspect of the present disclosure, a vehicle capable of directly providing an extinguishing agent delivered from an external source to a battery device may be provided.

A vehicle including a battery device and a fire extinguishing agent tank of the present disclosure may be widely applied in green technology fields, such as electric vehicles, battery charging stations, and solar power generation and wind power generation using batteries. In addition, a vehicle including a battery device and a fire extinguishing agent tank of the present disclosure may be used in eco-friendly electric vehicles, hybrid vehicles, etc. to prevent a climate change by suppressing air pollution and greenhouse gas emissions.

In some embodiments of the disclosed technology, a vehicle includes: a battery device; a fire extinguishing agent tank accommodating a fire extinguishing agent; a first flow path connected to the battery device and the fire extinguishing agent tank; a valve configured to regulate opening of the first flow path; a second flow path connected to the fire extinguishing agent tank; and an external inlet connected to the second flow path and configured to receive the fire extinguishing agent from an external device.

The external inlet may be configured to be opened, based on at least one of temperature or pressure of the battery device.

The vehicle may further include: a sensor configured to detect at least one of temperature or pressure of the battery device; and a processor configured to provide a signal for opening the valve, based on information detected by the sensor.

The processor may be configured to provide a signal for opening the external inlet, based on the information detected by the sensor.

The processor may be configured to transmit accident information of the vehicle to the outside, based on information detected by the sensor.

The external inlet may include a tube exposed to the outside of the vehicle.

The battery device may include a plurality of battery cells, a case accommodating the plurality of battery cells, and a fire extinguishing agent inlet formed in the case and connected to the first flow path.

The fire extinguishing agent delivered through the external inlet from the external device may be configured to be delivered to the battery device through the second flow path, the fire extinguishing agent tank, and the first flow path.

The fire extinguishing agent tank may include an outlet connected to the first flow path and an internal inlet connected to the second flow path.

The vehicle may further include: a sensor configured to detect the external device inserted into the external inlet; and a processor configured to change the internal inlet to an open state based on information detected by the sensor.

The vehicle may further include: a venting path connected to the battery device and spaced apart from the first flow path and the second flow path.

The extinguishing agent may include at least one of water, an insulating coolant, a foam extinguishing agent, a powder extinguishing agent, or a fire extinguishing gas.

The vehicle may further include a sealing structure configured to surround at least a portion of the external device and provide pressure to the external device when the external device is inserted into the external inlet.

The external inlet may be configured to be opened after the valve is opened.

BRIEF DESCRIPTION OF DRAWINGS

Certain aspects, features, and advantages of the disclosed technology are illustrated by the following detailed description with reference to the accompanying drawings.

DETAILED DESCRIPTION

Figure 1:
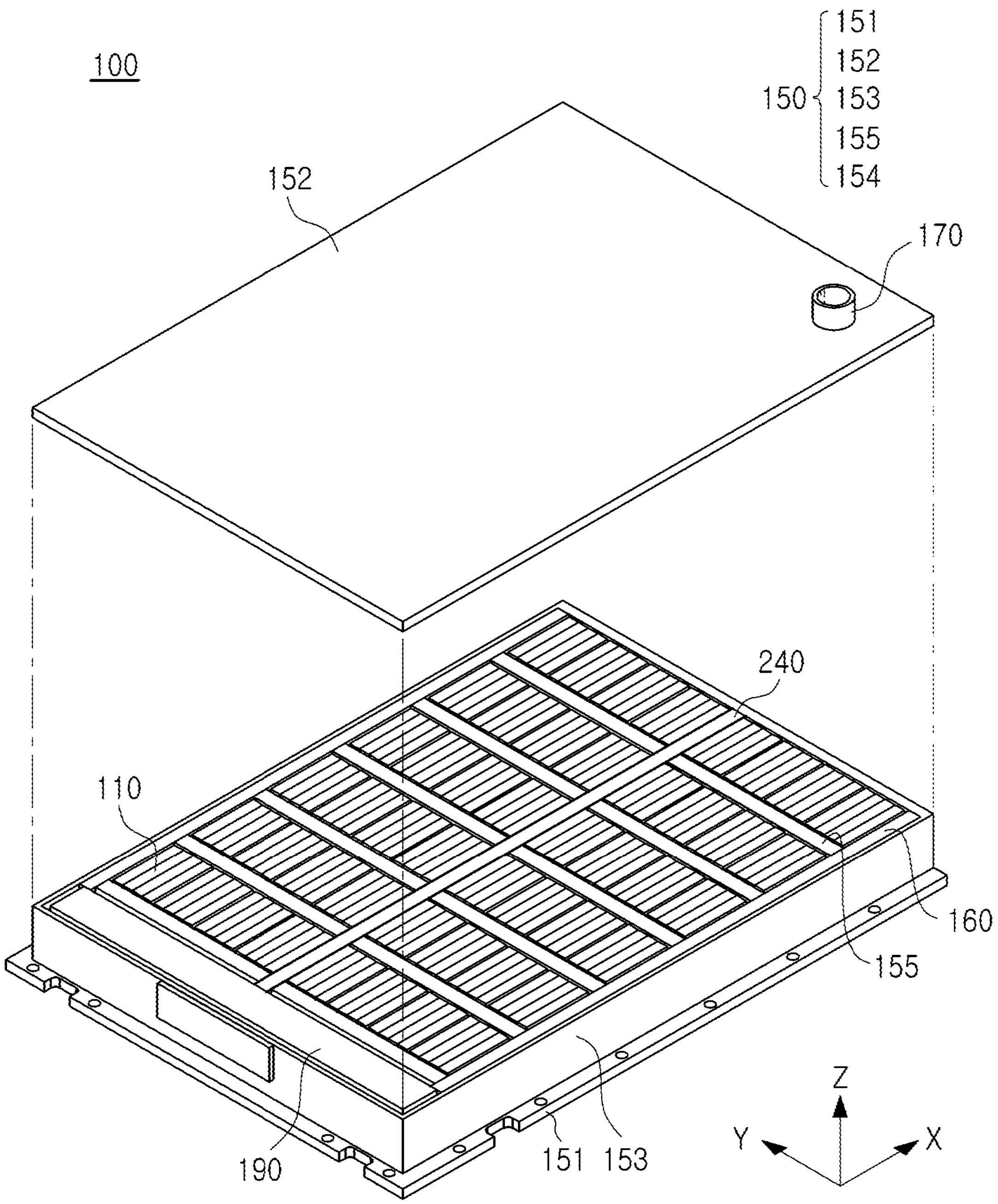
FIG. 1 is a perspective view of a battery device according to an embodiment.

The present disclosure will be described in detail with reference to the accompanying drawings. However, this is merely illustrative and the present disclosure is not limited to the specific embodiments described by way of example.

Terms and words used in the present specification and claims to be described below should not be construed as limited to ordinary or dictionary terms, and should be construed in accordance with the technical idea of the present invention based on the principle that the inventors may properly define their own inventions in terms of terms in order to best explain the invention.

Therefore, the embodiments described in the present specification and the configurations illustrated in the drawings are merely the most preferred embodiments of the present invention and are not intended to represent all of the technical ideas of the present invention, and thus should be understood that various equivalents and modifications may be substituted at the time of the present application.

Hereinafter, embodiments of the present invention will be described in detail with reference to the accompanying drawings. In this case, in the drawings, the same components are denoted by the same reference symbols as possible. Further, the detailed description of well-known functions and constructions which may obscure the gist of the present invention will be omitted. Some of the elements in the accompanying drawings are exaggerated, omitted, or schematically illustrated, and the size of each element does not entirely reflect the actual size.

Figure 2:
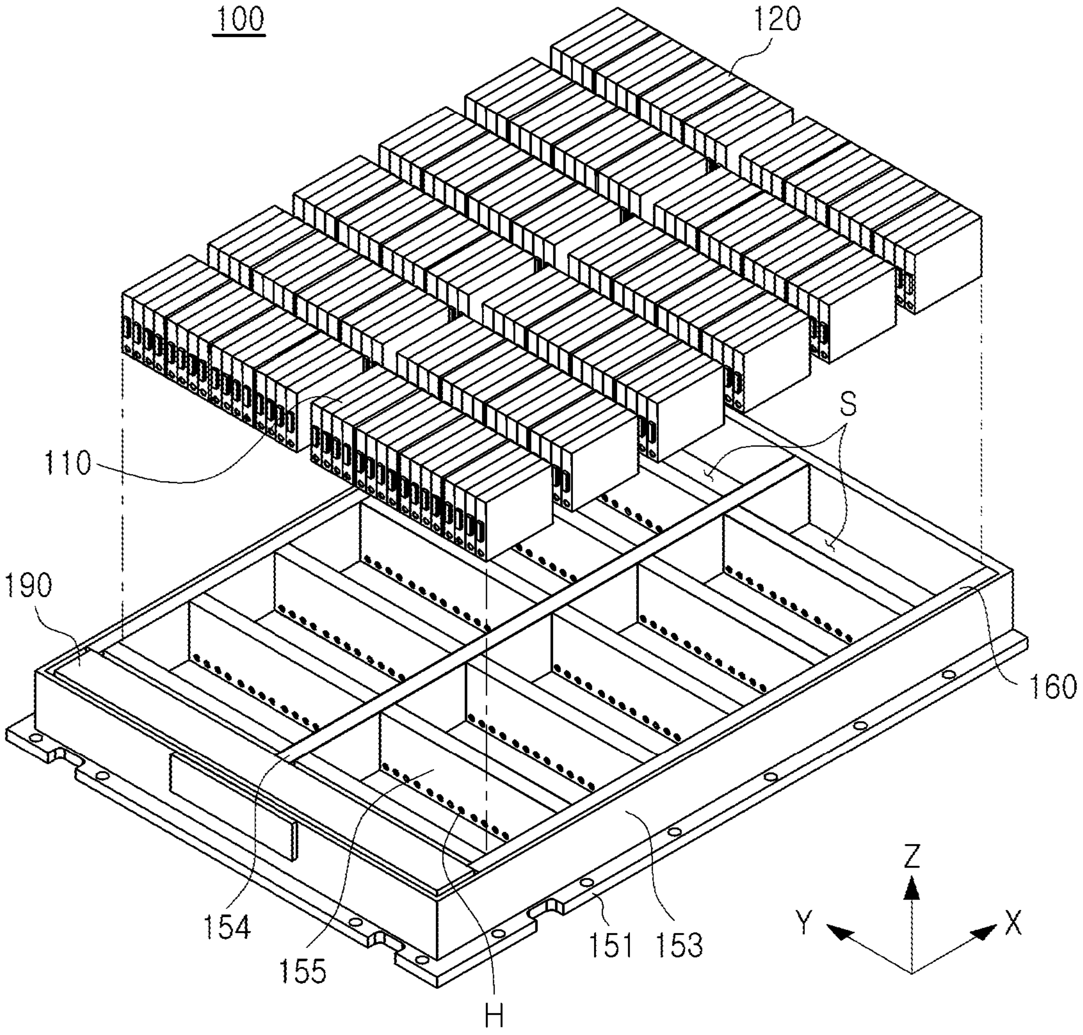
FIG. 2 is a perspective view illustrating a state in which a case and a cell stack in FIG. 1 are separated.

FIG. 1 is a perspective view of a battery device according to an embodiment. FIG. 2 is a perspective view illustrating a state in which a case and a cell stack in FIG. 1 are separated.

Referring to FIGS. 1 and 2, a battery device 100 may include at least one cell stack 110 and a case 150.

The cell stack 110 may include a plurality of stacked battery cells 120. The battery cell 120 may include an electrode assembly including a cathode (or a positive electrode), an anode (or a negative electrode), and a separator.

The case 150 may accommodate at least one cell stack 110. For example, the case 150 may include an accommodating space S for accommodating each cell stack 110.

The case 150 may include a bottom member 151 supporting a bottom surface of the cell stack 110, a cover member 152 covering a top surface of the cell stack 110, and a side wall member 153 connecting the bottom member 151 to the cover member 152.

The case 150 may include partitions 154 and 155 crossing at least a portion of the accommodating space S. For example, the accommodating space S may be divided into a plurality of spaces by the partitions 154 and 155. The partitions 154 and 155 may be installed across the accommodating space S to reinforce rigidity of the case 150. In an embodiment, the partitions 154 and 155 may include a first partition 154 and a second partition 155 arranged to be perpendicular to each other. In an embodiment, at least some of the partitions 154 and 155 may include venting holes H for guiding a path of gas and/or flames occurring in the battery cell 120.

In an embodiment, the battery device 100 may include duct member 160. A flow space in which gas and/or flames discharged from the cell stack 110 flow may be formed inside the duct member 160. The duct member 160 may be disposed within the case 150. The flow space of the duct member 160 may be connected to the venting hole H of the second partition 155. For example, gas and/or flames occurring in the battery cell 120 of the cell stack 110 may pass through the venting hole H of the second partition 155 and the flow space of the duct member 160 to be delivered to the outside of the battery device 100.

In an embodiment, the battery device 100 may include a fire extinguishing agent inlet 170 for receiving a fire extinguishing agent from the outside of the battery device 100. The fire extinguishing agent inlet 170 may be formed in a surface of the case 150. In an embodiment, the fire extinguishing agent inlet 170 may be formed in the cover member 152 of the case 150. According to another embodiment (not shown), the fire extinguishing agent inlet 170 may be formed in the side wall member 153 of the case 150 and/or the bottom member 151 of the case 150.

The battery device 100 may include a battery controller 190 to control the battery cell 120. The battery controller 190 may be disposed within the case 150. The battery controller 190 may include a battery management system (BMS). Since the configuration of the battery controller 190 is known in various forms, detailed descriptions thereof are omitted. In an embodiment, the battery controller 190 may be referred to as a processor.

The structure of the battery device 100 shown in FIGS. 1 and 2 is an example. For example, in FIGS. 1 and 2, the battery device 100 is illustrated as a battery pack including prismatic battery cells, but the structure of the battery device 100 is not limited thereto. For example, the battery device 100 may be a battery module including a cylindrical battery cell or a pouch-type battery cell or a battery pack including the battery module.

Figure 3:
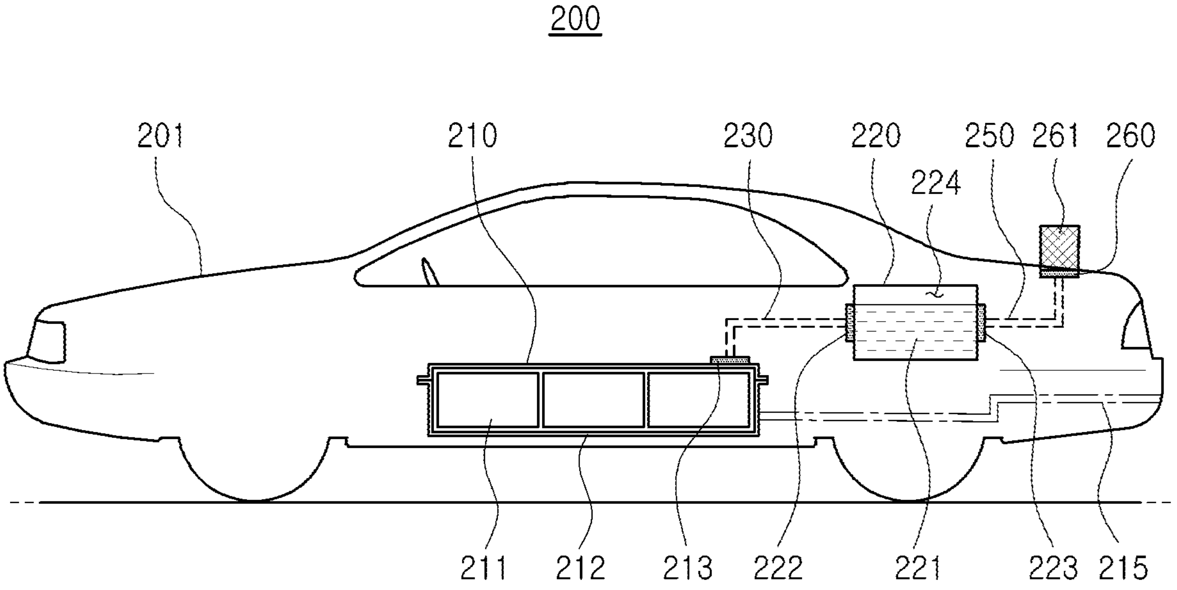
FIG. 3 is a schematic diagram of a vehicle including a battery device and a fire extinguishing agent tank, according to an embodiment.
Figure 4:
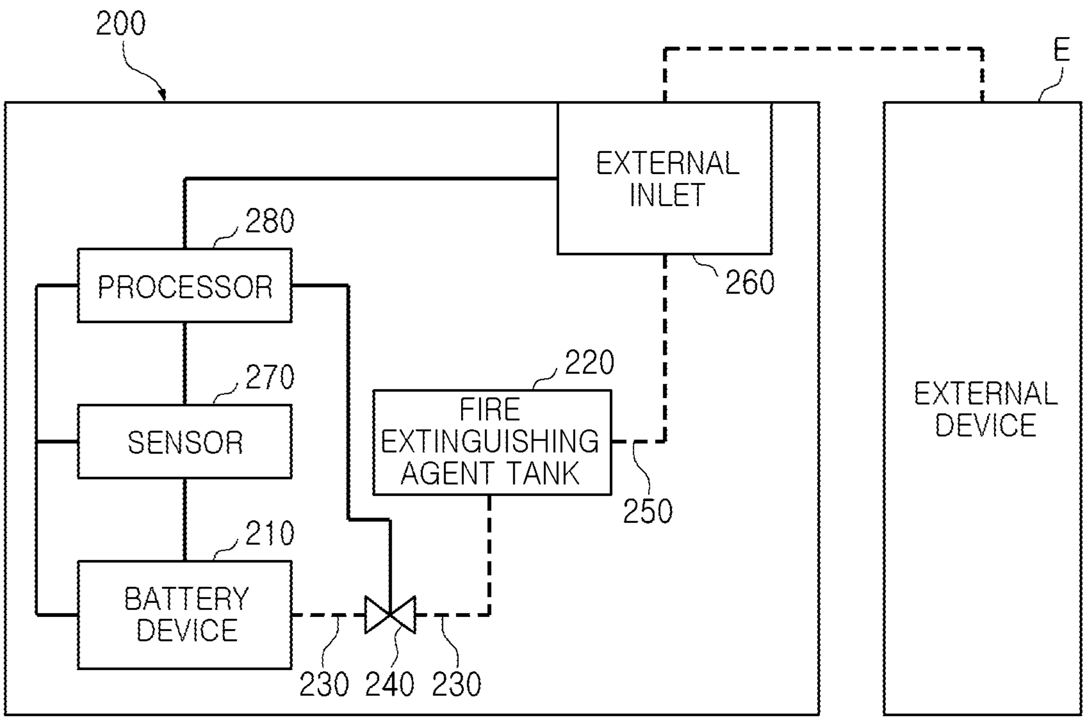
FIG. 4 is a block diagram of a vehicle including a battery device and a fire extinguishing agent tank, according to an embodiment.

FIG. 3 is a schematic diagram of a vehicle including a battery device and a fire extinguishing agent tank, according to an embodiment. FIG. 4 is a block diagram of a vehicle including a battery device and a fire extinguishing agent tank, according to an embodiment.

Referring to FIGS. 3 and 4, a vehicle 200 may include a battery device 210, a fire extinguishing agent tank 220, a first flow path 230, a valve 240, a second flow path 250, and/or an external inlet 260. The descriptions of the battery device 100 of FIGS. 1 and 2 may be applied to the battery device 210 of FIGS. 3 and 4. For example, the descriptions of the cell stack 110 and case 150 of FIGS. 1 and 2 may be applied to the battery module 211 and a case 212 of FIG. 3.

According to an embodiment, the vehicle 200 may be driven based on current generated by the battery device 210. For example, the vehicle 200 may include a motor (not shown), and the motor may operate based on current generated by the battery device 210. The vehicle 200 may include a body 201 accommodating a plurality of parts.

According to an embodiment, the vehicle 200 may include a venting path 215 forming a path for flames and/or gas occurring in the battery device 210. The venting path 215 may be connected to the battery device 210. For example, the venting path 215 may communicate with the venting hole H and the duct member 160 in FIG. 2. The venting path 215 may be a separate path separate from the first flow path 230 or the second flow path 250. The venting path 215 may be spaced apart from the first flow path 230 and the second flow path 250.

According to an embodiment, the battery device 210 may include a plurality of battery modules 211 and the case 212 accommodating the plurality of battery modules 211. In an embodiment, the battery device 210 may be referred to as a battery pack. According to an embodiment not shown, the battery device 210 may be a battery module. The battery device 210 may be disposed within the body 201 of the vehicle 200.

According to an embodiment, the battery device 210 may include a fire extinguishing agent inlet 213. The fire extinguishing agent inlet 213 may be connected to the first flow path 230. The fire extinguishing agent inlet 213 may be formed in the case 212.

The fire extinguishing agent tank 220 may include an accommodating space 224 accommodating at least a portion of a fire extinguishing agent 221. The extinguishing agent 221 may be used to extinguish a fire occurring in the battery device 210. A type of fire extinguishing agent 221 may be selectively designed. For example, the extinguishing agent 221 may include at least one of water, an insulating coolant, a foam extinguishing agent, a powder extinguishing agent, or a fire extinguishing gas.

The fire extinguishing agent tank 220 may include an outlet 222 for delivering the fire extinguishing agent 221 to the battery device 210 and an internal inlet 223 for receiving the fire extinguishing agent 221 from an external source. The internal inlet 223 may be referred to as a second inlet.

The outlet 222 may be connected to the first flow path 230. At least a portion of the fire extinguishing agent 221 located in the accommodating space 224 may be delivered to the battery device 210 through the outlet 222 and the first flow path 230. The internal inlet 223 may be connected to the second flow path 250. From an external source of the vehicle 200, the fire extinguishing t 221 may be delivered to the accommodating space 224 of the fire extinguishing agent tank 220 through the external inlet 260, the second flow path 250, and the internal inlet 223.

The first flow path 230 may be connected to the battery device 210 and the fire extinguishing agent tank 220. For example, the fire extinguishing agent 221 accommodated in the fire extinguishing agent tank 220 may be delivered to the battery device 210 through the first flow path 230. According to an embodiment, the first flow path 230 may be an empty space or a pipe formed in the body 201.

The valve 240 may control whether to connect the fire extinguishing agent tank 220 to the battery device 210. For example, valve 240 may allow or prevent delivery of the fire extinguishing agent 221 to the battery device 210.

According to an embodiment, the valve 240 may be disposed in at least one of the battery device 210, the fire extinguishing agent tank 220, or the first flow path 230. In an embodiment, the valve 240 may be disposed within the first flow path 230. In an embodiment, the valve 240 may be disposed within the extinguishing agent inlet 213 of the battery device 210. In an embodiment, the valve 240 may be disposed within the outlet 222 of the extinguishing agent tank 220.

The second flow path 250 may be connected to the fire extinguishing agent tank 220 and the external inlet 260. The fire extinguishing agent 221 delivered through the external inlet 260 may pass through the second flow path 250 and be delivered to the fire extinguishing agent tank 220.

The external inlet 260 may receive the fire extinguishing agent 221 from the outside of the vehicle 200. In an embodiment, an insertion portion (e.g., a hose) of an external device E accommodating the fire extinguishing agent 221 may be inserted into the external inlet 260. By inserting the external device E into the external inlet 260, the vehicle 200 may extinguish a fire occurring in the battery device 210 using a larger amount of fire extinguishing agents 221 than the amount of the fire extinguishing agents 221 accommodated in the fire extinguishing agent tank 220. According to an embodiment, the vehicle 200 receives the extinguishing agent 221 through the external inlet 260, thereby reducing heat transfer and thermal runaway of the battery device 210.

According to an embodiment, at least a portion of the external inlet 260 may be exposed to the outside of the body 201 of the vehicle 200. For example, the body 201 of the vehicle 200 may include a cover portion (not shown) that may cover the external inlet 260. A structure of the cover portion may be selectively designed. For example, as long as the cover portion of the body 201 may change to a state in which the cover portion covers the external inlet 260 or a state in which the cover portion exposes the external inlet 260 to the outside of the vehicle 200, the structure of the cover portion is not limited.

When the cover portion is opened, the external inlet 260 may be exposed to the outside of the vehicle 200. In an embodiment, the cover portion of the body 201 may be opened, based on a signal from a processor 280 based on information detected by a sensor 270, and at least a portion of the external inlet 260 may be exposed to the outside of the vehicle 200. For example, the processor 280 may open the cover portion when a detected temperature or detected pressure value is higher than a specified value. In an embodiment, the cover portion may be opened by a user input (e.g., a manual input).

According to an embodiment, the valve 240 and the external inlet 260 may be opened sequentially. For example, the external inlet 260 may be opened after the valve 240 is opened. In an embodiment, with the valve 240 opened and the external inlet 260 closed, the extinguishing agent 221 located in the extinguishing agent tank 220 may be delivered to the battery device 210. When the valve 240 and the external inlet 260 are opened substantially simultaneously and no pressure is provided from the external device E, the fire extinguishing agent 221 located in the fire extinguishing agent tank 220 may be sprayed to the outside of the vehicle 200 and fire extinguishing efficiency may be reduced.

According to an embodiment, the external inlet 260 may include a tube 261 configured to be connected to the external device E. For example, according to an embodiment, a length of tube 261 may vary. For example, the tube 261 may include a corrugated structure, and the length of the tube 261 extending from the body 201 of the vehicle 200 may vary.

According to an embodiment, the vehicle 200 may include a sealing structure to reduce leakage of the extinguishing agent 221 delivered from the external device E. The sealing structure may surround at least a portion of the external device E when the external device E is inserted into the external inlet 260. In an embodiment, the sealing structure may provide pressure to the external device E, thereby reducing leakage of the fire extinguishing agent 221 delivered from the external device E.

According to an embodiment, the vehicle 200 may include the sensor 270. The sensor 270 may include at least one of a temperature sensor or a pressure sensor. The sensor 270 may detect a temperature and/or pressure of the battery device 210.

According to an embodiment, the sensor 270 may include a wearing sensor or a proximity sensor for detecting the external device E inserted into the external inlet 260. The processor 280 may change the valve 240 to an open state when the sensor 270 detects insertion of the external device E. The processor 280 may change the open/closed state of the internal inlet 223 based on information detected by the sensor 270. The processor 280 may change the outlet 222 and/or the internal inlet 223 to an open state when the sensor 270 detects insertion of the external device E. According to an embodiment (not shown), the external inlet 260 may have a shape for delivering the fire extinguishing agent 221 supplied from the external device E to the fire extinguishing agent tank 220 when the external device E is inserted. For example, the external inlet 226 may include a stopper (not shown) configured to be open when the sensor 270 detects insertion of the external device E.

According to an embodiment, the vehicle 200 may include the processor 280. The processor 280 may be a battery controller disposed within the battery device 100 (e.g., the battery controller 190 of FIG. 1) or a vehicle controller (i.e., an electronic control unit (ECU)) configured to control parts of the vehicle 200.

According to an embodiment, the processor 280 may control opening and closing of the valve 240 based on information detected by the sensor 270. For example, the processor 280 may generate a signal for opening the valve 240 when a temperature of the battery device 100 detected by the sensor 270 is a specified temperature or higher. As another example, the processor 280 may generate a signal for opening the valve 240 when pressure of the battery device 100 detected by the sensor 270 is a specified pressure or greater.

According to an embodiment, the processor 280 may transmit accident information on the vehicle 200 to the outside based on information detected by the sensor 270. For example, when the temperature or pressure of the battery device 210 is the specified value or greater, the processor 280 may transmit accident information of the vehicle 200 to a pre-specified location (e.g., a fire station). The accident information may transfer a location of the vehicle 200, a type of the vehicle 200, and/or a current state (e.g., a temperature) of the vehicle 200. The accident information is information included in the accident an example information is not limited thereto.

According to an embodiment, the valve 240 may be opened independently of a signal generated by the processor 280. For example, the valve 240 may be physically deformed (e.g., ruptured) when the battery device 210 is equal to or greater than the specified temperature or the specified pressure. A state in which the extinguishing agent 221 is delivered from the extinguishing agent tank 220 to the battery device 210 may be referred to as opening of the valve 240. In an embodiment, valve 240 may include a rupture disk. In an embodiment, the valve 240 may include a one-way valve.

According to an embodiment, by opening the valve 240, the fire extinguishing agent 221 accommodated in the fire extinguishing agent tank 220 may be delivered to the battery device 210. For example, when the valve 240 is closed, the pressure inside the fire extinguishing agent tank 220 may be higher than the pressure of the battery device 210. By opening the valve 240, at least a portion of the fire extinguishing agent 221 located in the fire extinguishing agent tank 220 may be sprayed or discharged to the battery device 210. When ignition of a battery cell (e.g., the battery cell 120 in FIG. 2) occurs in the battery device 210, the fire extinguishing agent 221 located in the fire extinguishing agent tank 220 may be delivered to the battery device 210, and thus, heat transfer and/or thermal runaway of the battery device 210 may be delayed. Since the vehicle 200 includes the fire extinguishing agent tank 220, a fire occurring in the battery device 210 may be extinguished at an early stage.

According to an embodiment, the processor 280 may generate a signal for controlling whether to open the external inlet 260 based on information detected by the sensor 270. The external inlet 260 may be opened, based on at least one of the temperature or pressure of the battery device 210.

According to an embodiment, the fire extinguishing agent tank 220 may receive the fire extinguishing agent 221 from the external device E. For example, the external device E connected to the external inlet 260 may supply the fire extinguishing agent 221 to the vehicle 200. The fire extinguishing agent 221 supplied from the external device E may be delivered to the battery device 210 through the second flow path 250, the fire extinguishing agent tank 220, and the first flow path 230. According to an embodiment, as the vehicle 200 receives the fire extinguishing agent 221 through the external device E, the vehicle may extinguish a fire occurring in the battery device 210 using a greater amount of fire extinguishing agent 221 than the amount of fire extinguishing agents 221 that may be accommodated in the fire extinguishing agent tank 220. By using the extinguishing agent 221 supplied from the external device E, heat transfer and thermal runaway of the battery device 210 may be reduced.

The fire extinguishing agent 221 supplied from the external device E into the vehicle 200 may be directly sprayed into the battery device 210 using the flow paths 230 and 250. Since the vehicle 200 includes the first flow path 230, the second flow path 250, and the external inlet 260, fire extinguishing efficiency for extinguishing a fire occurring in the battery device 210 may be improved. For example, the amount of fire extinguishing agents 221 required for extinguishing the battery device 210 in the vehicle 200 of the present disclosure may be less than the amount of fire extinguishing agents required to extinguish the battery device 210 by spraying the fire extinguishing agent 221 by a fire extinguishing device (e.g., a fire truck) from the outside of the vehicle 200. By improving the fire extinguishing efficiency of the battery device 210, heat transfer and thermal runaway of the battery device 210 may be prevented.

Only specific examples of implementations of certain embodiments are described. Variations, improvements and enhancements of the disclosed embodiments and other embodiments may be made based on the disclosure of this patent document.

What is claimed is:

1. A vehicle comprising:
- a battery device;
- a fire extinguishing agent tank accommodating a fire extinguishing agent and including an outlet and an internal inlet;
- a first flow path connected to the battery device and the fire extinguishing agent tank;
- a valve configured to regulate opening of the first flow path;
- a second flow path connected to the fire extinguishing agent tank;
- an external inlet connected to the second flow path and configured to receive the fire extinguishing agent from an external device;
- a venting path connected to the battery device, fluidly isolated from the first flow path and the second flow path, and configured to form a path for at least one of flame or gas occurring in the battery device;
- a sensor configured to detect the external device inserted into the external inlet; and
- a processor configured to change the internal inlet to an open state based on information detected by the sensor,
- wherein the outlet is connected to the first flow path and the internal inlet is connected to the second flow path.

2. The vehicle of claim 1, wherein the external inlet is configured to be opened, based on at least one of temperature or pressure of the battery device.

3. The vehicle of claim 1, wherein
- the sensor is configured to detect at least one of a temperature or a pressure of the battery device; and the processor is configured to provide a signal for opening the valve based on information detected by the sensor.

4. The vehicle of claim 3, wherein the processor is configured to provide a signal for opening the external inlet, based on the information detected by the sensor.

5. The vehicle of claim 3, wherein the processor is configured to transmit accident information of the vehicle to the outside, based on information detected by the sensor.

6. The vehicle of claim 1, wherein the external inlet includes a tube configured to be connected to the external device.

7. The vehicle of claim 1, further comprising:

a cover portion configured to cover the external inlet and a body forming at least a portion of an outer surface of the vehicle;

where, when the cover portion is opened, the external inlet is exposed to the outside of the vehicle.

8. The vehicle of claim 1, wherein the battery device includes a plurality of battery cells, a case accommodating the plurality of battery cells, and a fire extinguishing agent inlet formed in the case and connected to the first flow path.

9. The vehicle of claim 1, wherein the fire extinguishing agent delivered through the external inlet from the external device is configured to be delivered to the battery device through the second flow path, the fire extinguishing agent tank, and the first flow path.

10. The vehicle of claim 1, wherein the extinguishing agent includes at least one of water, an insulating coolant, a foam extinguishing agent, a powder extinguishing agent, or a fire extinguishing gas.

11. The vehicle of claim 1, further comprising a sealing structure configured to surround at least a portion of the external device and provide pressure to the external device when the external device is inserted into the external inlet.

12. The vehicle of claim 1, wherein the external inlet is configured to be opened after the valve is opened.

* * * * *